United States Patent
Okada

(10) Patent No.: US 12,545,278 B2
(45) Date of Patent: Feb. 10, 2026

(54) OUTPUT SOUND ABNORMALITY DETECTION APPARATUS

(71) Applicant: ALPS ALPINE CO., LTD., Tokyo (JP)

(72) Inventor: Hiroki Okada, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 18/804,335

(22) Filed: Aug. 14, 2024

(65) Prior Publication Data
US 2025/0108822 A1 Apr. 3, 2025

(30) Foreign Application Priority Data
Sep. 29, 2023 (JP) ................. 2023-169877

(51) Int. Cl.
*B60Q 1/00* (2006.01)
*B60W 50/14* (2020.01)
*B60W 50/00* (2006.01)

(52) U.S. Cl.
CPC ..... *B60W 50/14* (2013.01); *B60W 2050/0022* (2013.01); *B60W 2050/143* (2013.01)

(58) Field of Classification Search
CPC ......... B60W 50/14; B60W 2050/0022; B60W 2050/143; G08B 29/10; H03F 2200/03; H03F 3/183; H03F 3/21; H03F 3/68; H03F 1/52; H04R 5/04; H04R 29/007; H04R 2499/13; H04R 29/001
See application file for complete search history.

(56) References Cited

U.S. PATENT DOCUMENTS

| | | | |
|---|---|---|---|
| 5,652,566 A * | 7/1997 | Lambert | G08B 29/10 340/508 |
| 10,580,288 B2 * | 3/2020 | Layton | G11B 20/10527 |
| 10,581,386 B2 * | 3/2020 | Nakata | H04R 3/00 |
| 11,120,642 B2 * | 9/2021 | Rapeta | H04R 29/00 |
| 2019/0378401 A1 | 12/2019 | Layton et al. | |
| 2020/0236482 A1 * | 7/2020 | Akahori | H04R 29/001 |

FOREIGN PATENT DOCUMENTS

| | | |
|---|---|---|
| CN | 115941566 | 4/2023 |
| EP | 2988435 | 9/2017 |
| JP | 2003-304123 | 10/2003 |
| JP | 2012-085040 | 4/2012 |

OTHER PUBLICATIONS

Extended European Search Report for EP24201306.8 mailed on Feb. 3, 2025.

* cited by examiner

*Primary Examiner* — Toan N Pham
(74) *Attorney, Agent, or Firm* — IPUSA, PLLC

(57) ABSTRACT

An output sound abnormality detection apparatus includes an output sound generation circuit configured to generate a first sound and a second sound, the first sound being an output target and the second sound having same content as content of the first sound; an amplifier configured to amplify and output the first sound and the second sound; a comparator configured to compare signal levels of the first sound and the second sound output from the amplifier; and an abnormality determination circuit configured to determine whether there is an abnormality in one or both of the first sound generated by the output sound generation circuit and the amplifier based on a comparison result obtained by the comparator.

6 Claims, 4 Drawing Sheets

FIG.2
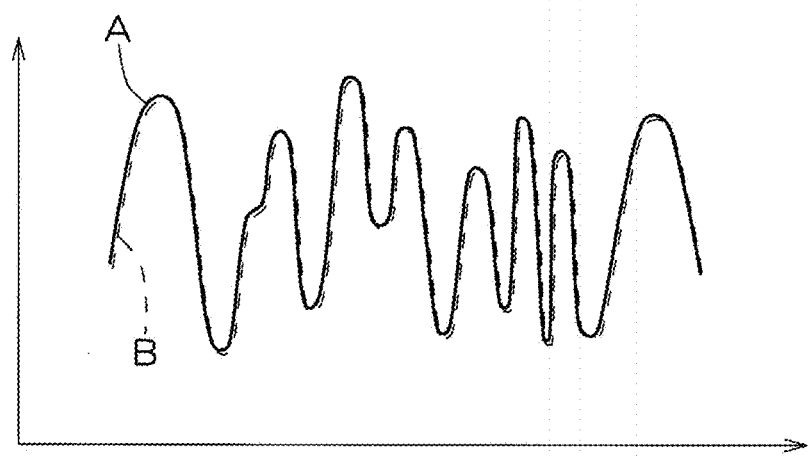
FIG.3A
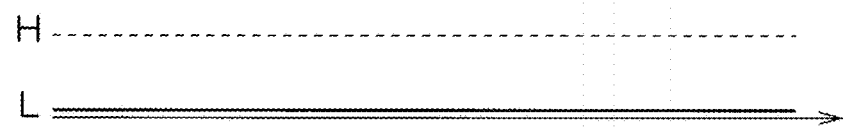
FIG.3B

OUTPUT SOUND ABNORMALITY DETECTION APPARATUS

CROSS-REFERENCE TO RELATED APPLICATIONS

This application is based on and claims priority to Japanese Patent Application No. 2023-169877, filed on Sep. 29, 2023, the entire contents of which are incorporated herein by reference.

BACKGROUND OF THE INVENTION

1. Field of the Invention

The present disclosure relates to an output sound abnormality detection apparatus that detects an abnormality in the output of a warning sound or the like.

2. Description of the Related Art

An audio amplifier that detects an operation abnormality of a power amplifier circuit used in the audio amplifier is known (see Japanese Laid-open Patent Publication No. 2003-304123, for example). In this audio amplifier, a determination part determines whether an output signal of the power amplifier circuit is abnormal in a state in which an audio signal is input into the power amplifier circuit from a preamplifier of a previous stage. Specifically, the determination part includes an output signal determination part, a time measurement part, and a comparison part. The output signal determination part is, for example, a comparator using a difference amplifier, and outputs an H-level signal when the voltage of an output signal from the power amplifier circuit exceeds a predetermined upper threshold value V2 or falls below a predetermined lower threshold value V1, and outputs an L-level signal in other cases. In a case where H is output from the output signal determination part, the time measurement part measures a time length Tsc during which H is continuously output by using a timer, and provides the comparison part with the time length Tsc. The comparison part compares the time length Tsc with a predetermined time length Tth, and if Tsc exceeds Tth, the comparison part determines that the operation of the audio amplifier is abnormal.

SUMMARY OF THE INVENTION

An output sound abnormality detection apparatus according to an embodiment of the present disclosure includes an output sound generation circuit configured to generate a first sound and a second sound, the first sound being an output target and the second sound having same content as content of the first sound; an amplifier configured to amplify and output the first sound and the second sound; a comparator configured to compare signal levels of the first sound and the second sound output from the amplifier; and an abnormality determination circuit configured to determine whether there is an abnormality in one or both of the first sound generated by the output sound generation circuit and the amplifier based on a comparison result obtained by the comparator.

BRIEF DESCRIPTION OF THE DRAWINGS

FIG. 2 is a diagram illustrating an example of data transmitted in accordance with the I²S standard;

FIGS. 3A and 3B are diagrams illustrating a sound of an L channel and a sound of an R channel output from an amplifier and a comparison result between the sounds of the L channel and the R channel;

DETAILED DESCRIPTION OF THE INVENTION

Figure 1:
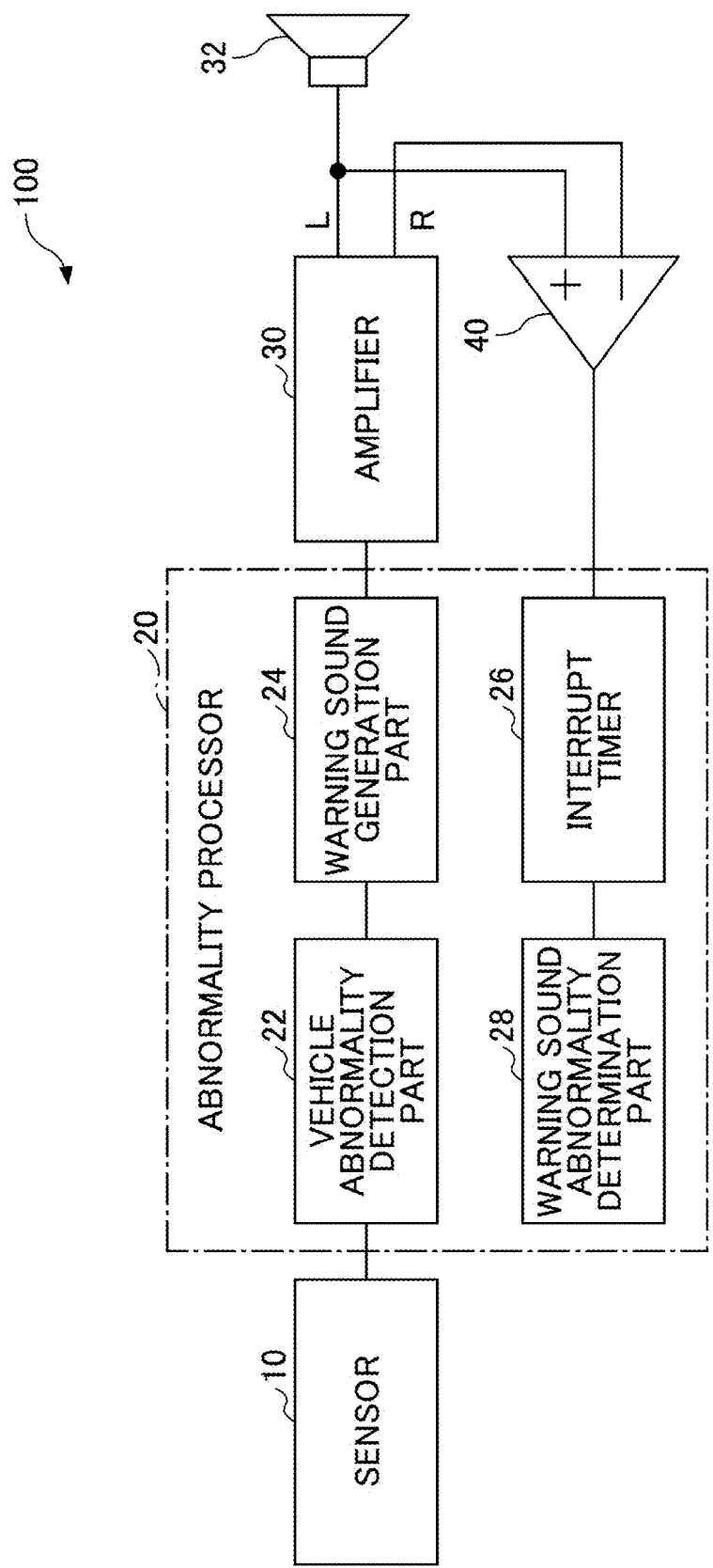
FIG. 1 is a diagram illustrating a configuration of an in-vehicle apparatus according to one embodiment.

Recently, some sounds are expected to be output in a reliable and accurate manner, such as various warning sounds that are output into the interior of a vehicle. However, in an abnormality detection operation of the audio amplifier described in Japanese Laid-open Patent Publication No. 2003-304123, although an operation abnormality can be detected if the power amplifier circuit is not operating normally, an abnormality in the content of a sound to be input into the power amplifier circuit cannot be detected.

According to an embodiment of the present disclosure, it is desirable to provide an output sound abnormality detection apparatus that can detect an abnormality in an output system, including an abnormality in the content of an output sound.

An output sound abnormality detection apparatus according to an embodiment of the present disclosure includes an output sound generation circuit configured to generate a first sound and a second sound, the first sound being an output target and the second sound having same content as content of the first sound; an amplifier configured to amplify and output the first sound and the second sound; a comparator configured to compare signal levels of the first sound and the second sound output from the amplifier; and an abnormality determination circuit configured to determine whether there is an abnormality in one or both of the first sound generated by the output sound generation circuit and the amplifier based on a comparison result obtained by the comparator.

The above-described abnormality determination circuit preferably determines that there is the abnormality in the amplifier, the output sound generation circuit, or both in a case where the comparison result obtained by the comparator indicates that the compared signal levels of the first sound and the second sound are different.

The second sound having the same content as the content of the first sound that is the output target is used, and the two sounds are compared. If there is no abnormality in the content of the first sound and in the operation of the amplifier, a comparison result indicating that the first sound and the second sound are the same is to be obtained. Accordingly, an abnormality in an output system, including an abnormality in the content of an output sound, can be detected based on a comparison result.

Further, each of the first sound and the second sound described above is preferably transmitted between the output sound generation circuit and the amplifier by using left and right channels in a data format in accordance with an Inter-IC Sound (I²S) standard. This ensures easily synchronization between the first sound and the second sound. By doing this, detection errors caused by any timing differences between the two sound inputs during comparison by the comparator can be eliminated.

Further, the above-described first sound is preferably a warning sound to be output to a user. Accordingly, it is possible to easily know whether a warning sound having a high degree of importance is normally output.

Further, the above-described second sound is preferably created by copying the warning sound. Accordingly, the content of the second sound can be reliably made the same as the content of the first sound.

Further, a sound of a signal level that is not correlated with the first sound is preferably included in the above-described second sound in a constant cycle. Accordingly, even if there is an abnormality in the comparator or a circuit of a subsequent stage, the abnormality can be detected based on a periodic comparison result.

An in-vehicle apparatus according to one embodiment, to which an output sound abnormality detection apparatus according to the present disclosure is applied, will be described with reference to the drawings.

FIG. 1 is a diagram illustrating a configuration of an in-vehicle apparatus 100 according to one embodiment. The in-vehicle apparatus 100 illustrated in FIG. 1 is configured to detect various abnormalities of a vehicle (vehicle abnormalities), output a warning sound corresponding to the content of each of the abnormalities, and detect an abnormality in an output system for the warning sound (a warning sound abnormality). The in-vehicle apparatus 100 includes a sensor 10, an abnormality processor 20, an amplifier 30, a speaker 32, and a comparator 40.

The sensor 10 measures the state of each of parts of the vehicle in which the in-vehicle apparatus 100 is installed, and outputs a corresponding measurement value. The abnormality processor 20 detects an abnormality of each of the parts of the vehicle based on the measurement value output from the sensor 10, generates a warning sound corresponding to the content of the abnormality, and determines whether there is an abnormality in the output system for the warning sound. There may be various abnormalities in the parts of the vehicle to be warned. For example, the sensor 10 may include at least one of a temperature sensor, a pressure sensor, a voltage sensor, a current sensor, a switch, or the like, and may detect an abnormality in an engine, an abnormality in an air pressure of a tire, non-wearing of a seat belt, or the like as an abnormal state. The present disclosure is intended to determine an abnormality in the output system for a warning sound, and specific examples of the sensor 10 and vehicle abnormalities are not limited to the above.

The abnormality processor 20 includes a vehicle abnormality detection part 22, a warning sound generation part 24, an interrupt timer 26, and a warning sound abnormality determination part 28.

The vehicle abnormality detection part 22 detects an abnormality in each of the parts of the vehicle based on a measurement result of the sensor 10. The warning sound generation part 24 generates a warning sound corresponding to the content of the abnormality detected by the vehicle abnormality detection part 22. For example, warning sound data is transmitted between the abnormality processor 20 and the amplifier 30 in a format in accordance with the Inter-IC Sound (I²S) standard. In this standard, PCM data of two left and right channels is transmitted through one signal line.

FIG. 2 is a diagram illustrating an example of data transmitted in accordance with the I²S standard. As illustrated in FIG. 2, sound data of an R channel and sound data of an L channel are alternately transmitted through one signal line. In the present embodiment, for example, a monaural warning sound is transmitted by using the L channel. The same sound data as the warning sound of the L channel is copied and stored in the R channel.

The operation of the interrupt timer 26 and the operation of the warning sound abnormality determination part 28 will be described later.

Sound data generated by the warning sound generation part 24 is input into the amplifier 30. The amplifier 30 converts and amplifies the sound data (sound data of both the L channel and the R channel) into analog audio signals for output from the speaker 32. Note that a warning sound of the L channel is output from the speaker 32, but a sound of the R channel having the same content is also amplified at the same time.

The comparator 40 compares a signal level of the warning sound of the L channel output from the amplifier 30 with a signal level of the sound of the R channel. If these signal levels are the same, the comparator 40 outputs an L-level signal, and if these signal levels are different, the comparator 40 outputs an H-level signal.

FIGS. 3A and 3B are diagrams illustrating a sound of the L channel and a sound of the R channel output from the amplifier 30 and a comparison result between the sounds of the L channel and the R channel. A sound A (warning sound) of the L channel and a sound B of the R channel are transmitted in a synchronized state as one serial data, and thus the waveforms (signal levels) of these sounds are the same as illustrated in FIG. 3A. Therefore, in a case where no abnormality occurs in the output system for the warning sound, the comparator 40 compares signals of the same level, and the comparator 40 outputs an L-level signal as illustrated in FIG. 3B.

The interrupt timer 26 of the abnormality processor 20 periodically receives the output (L level/H level) of the comparator 40, and generates an interrupt if a H-level signal is received (if an abnormality has occurred in the output system for the warning sound). In response to the generation of the interrupt, the warning sound abnormality determination part 28 determines that an abnormality has occurred in the output system for the warning sound. When the warning sound abnormality determination part 28 determines that the abnormality has occurred, a warning sound for notifying a user of this abnormality cannot be output from the speaker 32, and thus the user is notified of the abnormality by another method. For example, a warning may be displayed on a display device (not illustrated) so as to notify the user that the abnormality has occurred in the output system for the warning sound.

In this manner, the in-vehicle apparatus 100 according to the present embodiment uses a sound of the R channel having the same content as the content of a warning sound (a sound of the L channel), which is the output target, and compares the two sounds. If there is no abnormality in the content of the warning sound or in an operation (a digital-analog conversion operation or an amplification operation) of the amplifier 30, an L-level signal indicating that the two sounds are the same is to be output as a comparison result. Accordingly, the warning sound abnormality determination part 28 can detect an abnormality in the output system, including an abnormality in the content of a warning sound, based on a comparison result.

Further, by using the left and right channels in a data format in accordance with the I²S standard, a sound of the L channel, which is a warning sound, and a sound of the R channel to be compared with the sound of the L channel can be easily synchronized. Thus, when the comparator 40 performs a comparison operation, a detection error due to a difference between input timings of the sounds can be eliminated.

Further, because an abnormality in a warning sound that is to be output to the user is detected, it is possible to easily know whether a warning sound having a high degree of importance is normally output.

Further, a sound of the R channel, which is compared with a warning sound of the L channel, is created by copying the warning sound, and thus the content of the sound of the R channel can be reliably made the same as the content of the warning sound of the L channel.

The present invention is not limited to the above-described embodiment, and various modifications can be made within the scope of the present invention. In the above-described embodiment, a sound of the R channel having the same content as the content of a warning sound of the L channel is included as sound data in accordance with the I²S standard. However, a sound of a signal level that is not correlated with the warning sound of the L channel may be included in a sound of the R channel in a predetermined cycle.

Figure 4:
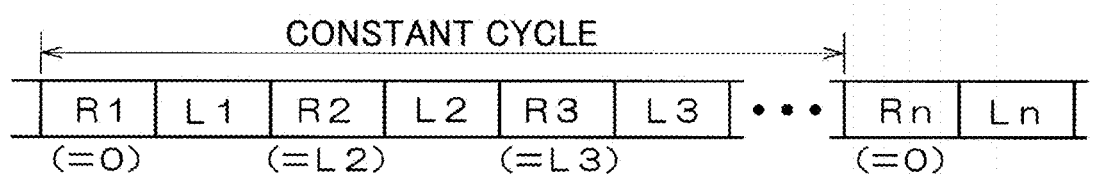
FIG. 4 is a diagram illustrating another example of data transmitted in accordance with the I²S standard.

FIG. 4 is a diagram illustrating another example of data transmitted in accordance with the I²S standard. In the example illustrated in FIG. 4, an L channel includes sound data indicating a warning sound, and an R channel includes sound data indicating 0 (corresponding to a signal of 0 level) in each constant cycle.

Figure 5:
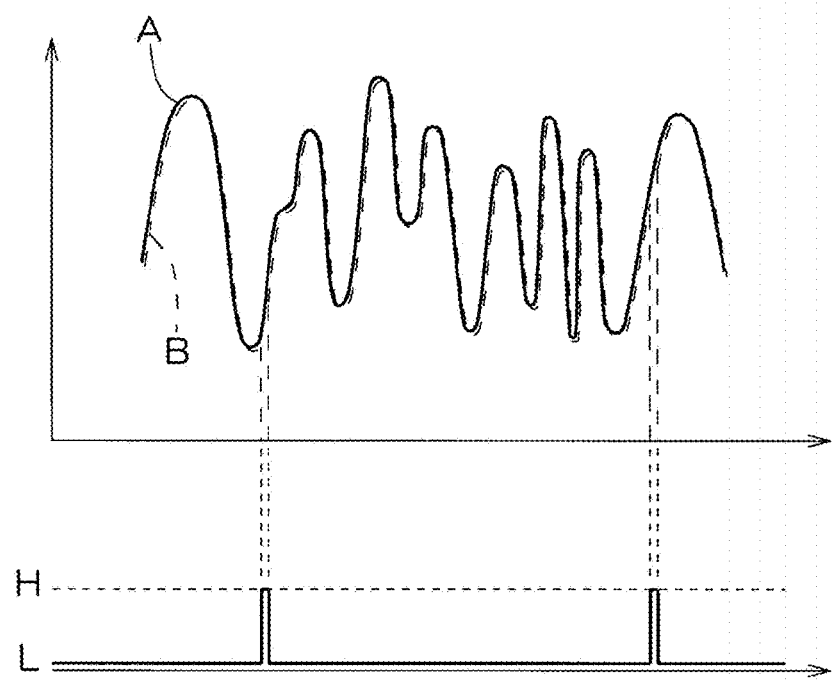
FIG. 5 is a diagram illustrating an modified example of a sound of an L channel and a sound of an R channel output from the amplifier and a comparison result between the sounds of the L channel and the R channel.

FIG. 5 is a diagram illustrating an modified example of a sound of the L channel and a sound of the R channel output from the amplifier 30 and a comparison result between the sounds of the L channel and the R channel. A warning sound of the L channel and a sound of the R channel are basically the same. However, the sound of the R channel temporarily becomes 0 level in a constant cycle (see the upper part of FIG. 5), and thus the comparator 40 temporarily outputs an H-level signal in the constant cycle. Therefore, the interrupt timer 26 generates an interrupt in the constant cycle. The warning sound abnormality determination part 28 can confirm that the comparator 40 and circuits (the interrupt timer 26 and the like) of subsequent stages of the comparator 40 are normally operating based on the interrupt generated in the constant cycle. Further, if an interrupt is generated at a timing other than the constant cycle, it is determined that there is an abnormality in the content of a warning sound or in the output system, as in the above-described embodiment.

Further, in the above-described embodiment, the comparator 40 is used to compare two sounds (a warning sound of the L-channel and a sound of the R channel) output from the amplifier 30; however, the comparator 40 may be replaced with an analog adder.

Figure 6:
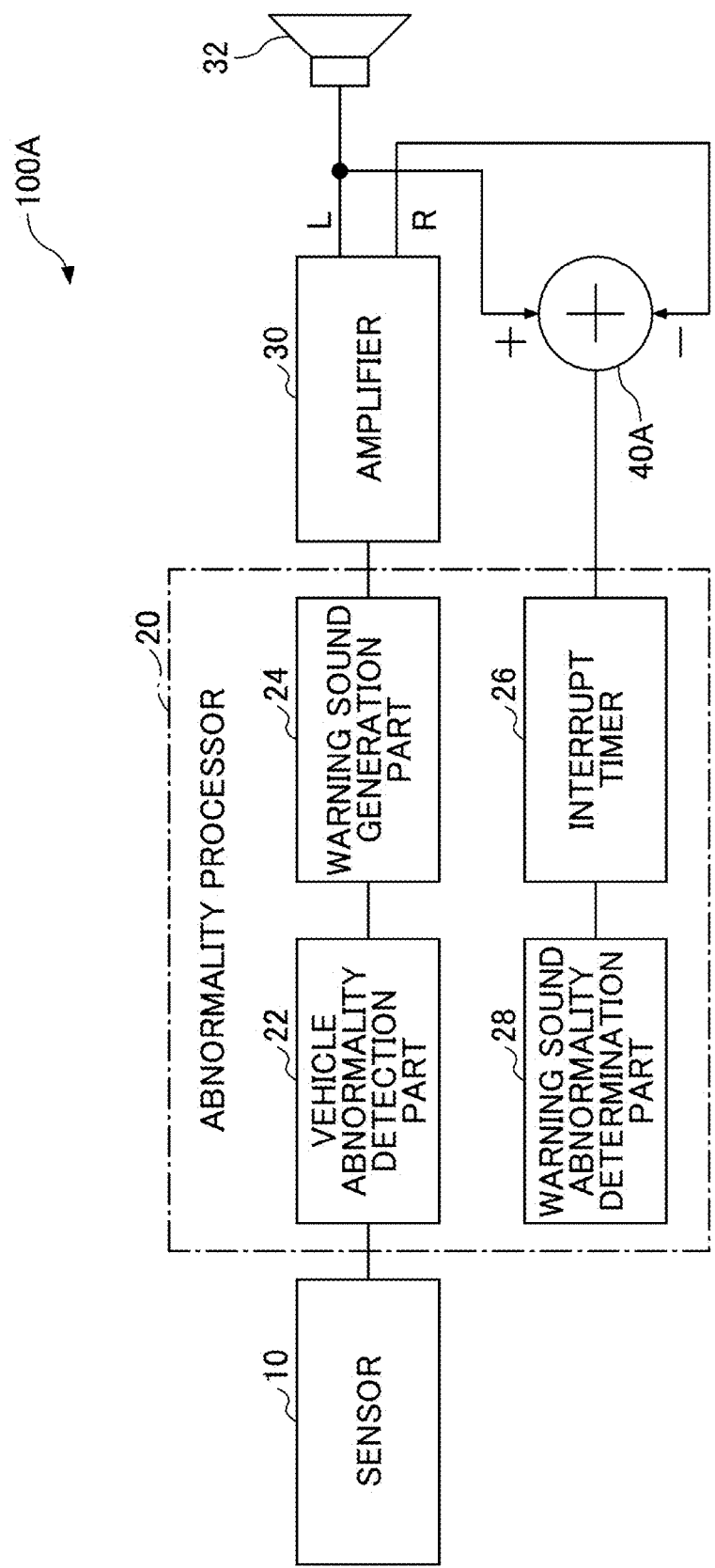
FIG. 6 is a diagram illustrating a configuration of an in-vehicle apparatus according to a modification.

FIG. 6 is a diagram illustrating a configuration of an in-vehicle apparatus 100A according to a modification. The in-vehicle apparatus 100A illustrated in FIG. 6 differs from the in-vehicle apparatus 100 illustrated in FIG. 1 in that the comparator 40 is replaced with an analog adder 40A. The analog adder 40A performs analog addition of a sound (warning sound) of the L channel, which is not inverted and input, and a sound of the R channel, which is inverted and input. Because the sound of the R channel is inverted and input, the analog adder 40A subtracts a signal level of the sound of the R channel from a signal level of the warning sound of the L channel. Therefore, if signal levels of the warning sound of the L channel and the sound of the R channel are the same, the output of the analog adder 40A is at the L level, and the same output as that of the comparator 40 illustrated in FIG. 1 is obtained. If the signal levels of the warning sound of the L channel and the sound of the R channel are different from each other, the output of the analog adder 40A is at a level higher than the L level in accordance with a difference between the signal levels. The interrupt timer 26 generates an interrupt in accordance with such level information, and the warning sound abnormality determination part 28 determines whether there is an abnormality.

Further, in the above-described embodiment, an example in which a warning sound is transmitted in accordance with the I²S standard has been described; however, the warning sound may be transmitted in a format in accordance with another standard. Further, in the above-described embodiment, a sound to be output is a warning sound; however, the present invention may be applied to a configuration in which a sound other than the warning sound, for example, a specific announcement sound is output.

INDUSTRIAL APPLICABILITY

As described above, according to the present disclosure, a sound having the same content as the content of a warning sound that is the output target is used, and the two sounds are compared. If there is no abnormality in the content of the warning sound or an operation of the amplifier 30, a comparison result indicating that the two sounds are the same is to be obtained. Accordingly, an abnormality in an output system, including an abnormality in the content of a warning sound, can be detected based on a comparison result.

What is claimed is:

1. An output sound abnormality detection apparatus comprising:
    an output sound generation circuit configured to generate a first sound and a second sound, the first sound being an output target and the second sound having same content as content of the first sound;
    an amplifier configured to amplify and output the first sound and the second sound;
    a comparator configured to compare signal levels of the first sound and the second sound output from the amplifier; and
    an abnormality determination circuit configured to determine whether there is an abnormality in one or both of the first sound generated by the output sound generation circuit and the amplifier based on a comparison result obtained by the comparator.

2. The output sound abnormality detection apparatus according to claim 1, wherein the abnormality determination circuit determines that there is the abnormality in the amplifier, the output sound generation circuit, or both in a case where the comparison result obtained by the comparator indicates that the compared signal levels of the first sound and the second sound are different.

3. The output sound abnormality detection apparatus according to claim 1, wherein each of the first sound and the second sound is transmitted between the output sound generation circuit and the amplifier by using left and right channels in a data format in accordance with an Inter-IC Sound (I²S) standard.

4. The output sound abnormality detection apparatus according to claim 1, wherein the first sound is a warning sound to be output to a user.

5. The output sound abnormality detection apparatus according to claim 4, wherein the second sound is created by copying the warning sound.

6. The output sound abnormality detection apparatus according to claim 1, wherein a sound of a signal level that is not correlated with the first sound is included in the second sound in a constant cycle.

\* \* \* \* \*